June 19, 1962 L. P. THOMAS, JR., ET AL 3,040,298
REMOTE CONTROL SYSTEM
Filed March 6, 1958
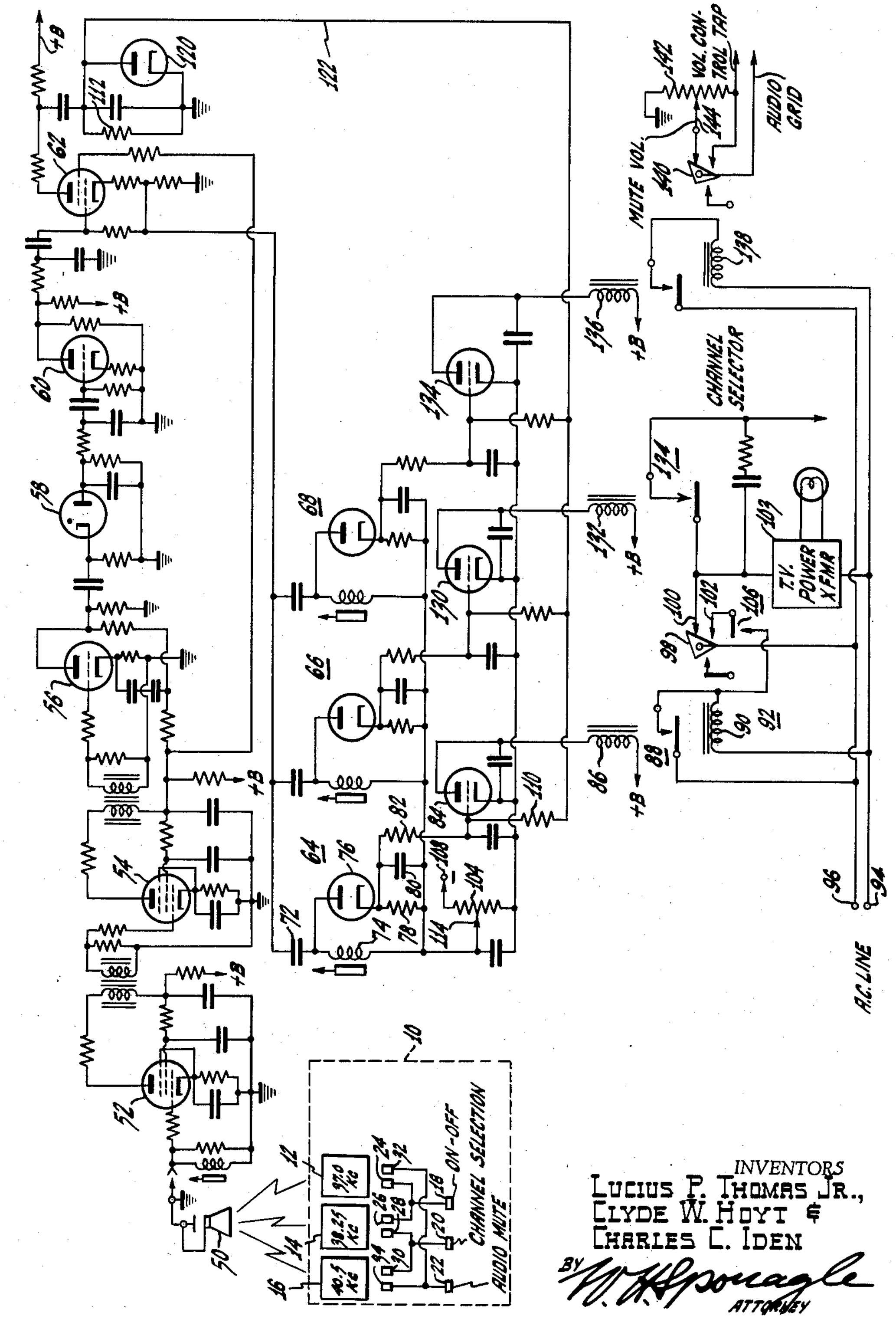
INVENTORS
LUCIUS P. THOMAS JR.,
CLYDE W. HOYT &
CHARLES C. IDEN
BY W. H. Sprague
ATTORNEY United States Patent Office 3,040,298

Patented June 19, 1962

3,040,298

REMOTE CONTROL SYSTEM

Lucius P. Thomas, Jr., Woodcrest, Clyde W. Hoyt, Pennsauken, and Charles C. Iden, Haddon Heights, N.J., assignors to Radio Corporation of America, a corporation of Delaware Filed Mar. 6, 1958, Ser. No. 719,578

4 Claims. (Cl. 340—171)

This invention relates to wireless remote control systems, and more particularly relates to the control of remotely located apparatus by radio waves or sound waves.

Various types of wireless remote control systems have heretofore been proposed wherein a local transmitter is caused to radiate radio or sound control signal waves having predetermined frequency or modulation characteristics for reception by, and control of, remotely located apparatus. Systems of this type have been commonly used to control the operation of remotely located radio or television receivers thereby enabling the listener or viewer to adjust the tuning, volume, etc. without first moving to the receiver.

One disadvantage encountered in remote control systems of this type is the erroneous actuation of the remote circuits when the frequency of spurious radiations from electronic equipment (for systems using radio waves), or random sounds from jingling keys or coins etc. (for systems using sound waves) corresponds to the frequency of one of the control signals. Furthermore, changes in temperature cause a change in the characteristics of the resonant elements in the transmitter. For example, in remote control systems using supersonic sound waves generated by mechanical resonators, changes in temperature produce variations in the characteristics of the resonators, thereby changing the resonant frequency thereof. Likewise, the circuit components of a radio wave transmitting system may be affected by temperature changes to vary the operating frequency of the transmitter. The resulting changes in the frequency of the transmitted wave deleteriously affects the operation of the system, since the remote control signal receiver circuits are ordinarily sharply tuned to the frequencies of the different control signals.

Accordingly, it is an object of this invention to provide an improved wireless remote control system.

It is a further object of this invention to provide an improved wireless remote control system wherein the remotely controlled apparatus is substantially immune to undesired actuation by spurious or random signals.

A still further object of this invention is to provide an improved wireless remote control system of the type using sound waves generated from mechanical resonators, wherein changes in temperature have virtually no effect on the operation of the system.

In accordance with the invention, the local transmitter of a remote control system comprises means for simultaneously transmitting two control signals for each function to be controlled at the remote location. These signals are processed by a receiver at the remote location which is operative to produce a resultant beat frequency signal which is applied to a plurality of frequency selective circuits. The frequencies of the control signals are selected so that the frequency of each of the resulting beat signals is different for each function to be controlled. Since there are two control signals transmitted, the probabilities of two simultaneously occurring radiations of the proper frequencies, and duration to actuate the remote apparatus is considerably reduced.

Furthermore, changes in temperature have little effect on remote control systems in accordance with the invention wherein two control signals are simultaneously transmitted and the actuation of the remotely controlled apparatus is a function of the difference in frequency between these signals. This is because two resonant elements or circuits are used, and for an increase in temperature, both change in the same direction, and therefore the resonant frequencies of both change a similar amount. Since the resonant frequencies of both resonators change by substantially the same amount, the tendency is to maintain the beat frequency signal substantially constant.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawing in which the sole FIGURE is a diagrammatic illustration of a supersonic control transmitter, and a schematic circuit diagram of a receiver which is responsive to supersonic sound waves from the transmitter to actuate predetermined control circuits.

The transmitter 10 of the remote control system of the invention includes a plurality of sound wave generating elements hereinafter called resonators 12, 14 and 16 which are resonant at supersonic frequencies. By way of example, these resonators may comprise cylindrical aluminum rods which are designed to resonate at 37.0, 38.25 and 40.5 kilocycles respectively when suitably excited. Cylindrical rods of this type inherently vibrate in a longitudinal mode of vibration when sharply struck on the end. These rods may be supported in any known manner. For example, as suggested on page 534 of "Sound Waves and Acoustics," by M. Y. Colby, published by Henry Holt and Co. Inc., the rods may be supported in the center by a wire clip or the like to damp out second harmonic vibrations. It may be desirable to provide additional damping at the center of the rod to damp out transverse vibrations which not only may produce an unpleasant sound, but it is possible that a harmonic of the transverse vibration may cause erroneous triggering of the remote circuits.

The remote control system shown in the drawing is designed to control three functions of a television receiver. The first of these functions is the receiver on-off control, which controls the application of power from the A.C. supply mains to the receiver. The second of these control functions is that of receiver tuning. This is effectively accomplished by controlling a motor which is mechanically coupled to drive the rotor element of a conventional step-by-step television tuner. The third function is an audio muting circuit which is effective to eliminate or reduce the audio level by a predetermined amount. It is to be understood that other control functions could be added by increasing the number of resonators without departing from the scope of the present invention.

In order to actuate any of the above functions at the remote location, two of the resonators 12, 14 and 16 are caused to vibrate, thereby emitting two supersonic sound waves of different frequencies. The mechanism for exciting the resonators is entirely conventional except that two of the resonators are excited at the same time. If the resonators are to be actuated by a push-button, two hammers are mechanically linked to each push-button, and an escapement mechanism (not shown) is provided so that after the push-button has been depressed a certain amount, the hammers are released to sharply impinge on selected ones of the resonators. It may be desirable to mount the hammers on resilient supports (not shown) to prevent mulitple striking of the resonators. In this respect the actuating mechanism is similar to that found in musical instruments such as a piano. More specifically, a mechanism for striking a resonator which resonates in a longitudinal mode of vibrations is incorporated in a celesta, such as shown on page 174 of "Musical Engineering," by H. F. Olson, published by the McGraw-Hill Book Co.

In the transmitter 10, three separate push-buttons 18, 20 and 22 are provided for the "On-Off," "Channel Selection" and "Audio Mute" controls respectively. When the push-button 18 is depressed, a pair of hammers 24 and 26 are caused to impinge sharply on one end of each of the resonators 12 and 14 setting these resonators into vibration and causing supersonic sound waves to be radiated at 37.0 and 38.25 kilocycles. Similarly, to change channels, the push-button 20 is depressed. This causes a pair of hammers 28 and 30 to impinge on the resonators 14 and 16 which, in turn, causes supersonic sound waves at 38.25 and 40.5 kilocycles to be radiated. In like manner, to mute the sound without affecting the video portion of a television program, the push-button 22 is depressed. The push-button 22 is mechanically coupled to the hammers 32 and 34 which are caused to strike the tuning rods 12 and 16 to excite these rods into vibration whereby supersonic sound waves at 37.0 and 40.5 kilocycles respectively are radiated.

At the remote location which in the present case is the television receiver, the radiated supersonic control signals are picked up by a microphone 50 which converts these sound signals into corresponding electrical signals. The electrical signals produced by the microphone 50 are amplified in the bandpass amplifier stages 52, 54 and 56 which are responsive to signals in the entire band of frequencies to be received. In the present case the bandpass of the amplifier stages 52, 54 and 56 extends from slightly less than 37.0 kilocycles to slightly more than 40.5 kilocycles which are the lowest and highest frequencies of the transmitted sound signals. Sufficient selectivity is provided so that signals of a frequency falling substantially outside this frequency range will be effectively rejected.

A detector 58 is coupled to the output circuit of the third amplifier stage 56. When a pair of simultaneously radiated control signals are received, the detector 58 serves to derive a beat frequency signal corresponding in frequency to the difference in frequency between the two transmitted control signals. The resulting beat frequency signal is then further amplified by the low frequency amplifiers 60 and 62.

The amplifier 62 is connected as a cathode follower to drive three frequency selective circuits 64, 66 and 68 each of which is responsive to signals of a different frequency to produce a control voltage. This control voltage, in turn, is used to trigger the desired control function. Since each of the frequency selective circuits is essentially the same with the exception of the tuning of the resonant circuit elements therein, only the frequency selective circuit 64 will be described in detail. It should be noted here that the frequency selective circuit 64 produces a control signal for controlling the receiver "On-Off." Accordingly this circuit is responsive to 1.25 kc. which is the difference between the 37.0 and 38.25 kc. signals produced when the on-off button 18 is depressed. The frequency selective circuits 66 and 68 control the channel selection and audio mute circuits respectively and are tuned to 2.25 and 3.5 kc. respectively. From the foregoing it will be seen that 2.25 and 3.5 kc. are the beat frequencies produced when the push-buttons 20 and 22 are depressed.

The resonant circuit elements of the frequency selective circuits 64 comprise a capacitor 72 and an inductor 74 which are tuned to series resonance at 1.25 kc. This circuit further includes a rectifier 76 and a resistor 78 which are connected in series across the inductor 74. When a 1.25 kc. signal is applied to the frequency selective circuit 64, a relatively large voltage is developed across the inductor 74. This voltage is rectified by the rectifier 76 causing a D.C. voltage to be developed across the resistor 78 such that the cathode of the rectifier 76 becomes more positive. The voltage appearing at the cathode of the rectifier 76 is filtered by a capacitor 80 and is applied through a resistor 82 to the input circuit of a keying amplifier including a triode electron tube 84. This positive control voltage triggers into conduction the keying amplifier 84 which is normally blocked by a suitably negative biasing voltage.

The negative biasing voltage for the amplifier 84 is provided by a voltage divider connected between ground and a point of negative potential indicated by the terminal 108. The voltage divider itself comprises a portion of the potentiometer 104, three series resistors 78, 82 and 110 taken in parallel with the corresponding three resistors in the other frequency selective circuits 66 and 68 and a resistor 112. The resistance values of the various resistors and the magnitude of the negative voltage at the terminal 108 are selected to provide a cut-off voltage for the various keying amplifiers such as the triode 84. However, the particular threshold level at which these amplifiers begin to conduct is controlled by the position of a movable tap 114 along the potentiometer 104.

Additional negative bias potential for the keying amplifiers is provided by the rectifier 120 which is connected in the anode output circuit of the low frequency amplifier 62. The circuit including the rectifier 120 is essentially a detector for developing a voltage proportional to the amplitude of any low frequency signal reaching the low frequency amplifier 62. The negative voltage which is developed across the resistor 112 is applied by way of the conductor 122, to the input circuits of the various keying amplifiers. This voltage is combined with the fixed negative voltage to drive the keying amplifiers further into cut-off.

When the keying amplifier 84 is triggered to conduct by the positive voltage from the rectifier 76, a relay winding 86 which controls the opening and closing of the contacts 88 is energized. The relay contacts 88 in turn are connected in circuit to control the application of energizing voltage such as 115 v. A.C. from the terminals 94 and 96 to the winding 90 of a bi-stable relay 92. The bi-stable relay 92, as the name implies, moves to a first position when power is applied to the winding 90 wherein the movable contact 98 engages the fixed contact 100. After the power is removed by the opening of the contacts 88 the bi-stable relay contacts remain in this position. When the relay 92 is energized a second time the movable contact 98 thereof moves to a second position to engage the fixed contact 102, and remains there after power is removed from the winding 90. Upon successive energizations of the winding 92 in response to successive operations of the push-button 18 at the remote control position, the movable contact 98 moves back and forth between the fixed contacts 100 and 102 as described.

When the movable contact 98 of the bi-stable relay 92 is in engagement with the fixed contact 100, power is supplied to the television receiver. In the present case, the television receiver power supply is indicated by the power transformer 103. One side of the transformer 103 is permanently connected to the terminal 94 of the A.C. supply, and the other side of the transformer is connected to the terminal 96 of the A.C. supply through the contacts 98 and 100. When the movable contact 98 engages the fixed contact 102, the A.C. power circuit to the television receiver is broken. A switch 106 is provided for turning the receiver on at the receiver. When the contacts 98 and 102 are in engagement, the power circuit to the television receiver is broken as mentioned above. However, the contacts 98 and 102 together with the switch 106 complete the power circuit for the winding 90 of the bi-stable relay 92. Thus, by closing the switch 106, power from the A.C. terminals 94 and 96 is applied to the bi-stable relay causing the movable contact 98 to engage the fixed contact 100, thereby completing the receiver power circuit.

The frequency selective circuit 66 in the channel selection control circuit is responsive to a beat signal having a frequency of 2.25 kc. produced in response to the operation of the push-button 20 at the remote control position and controls a keying amplifier 130. Conduction by the amplifier 130 energizes a relay 132 causing the contacts 134 thereof to close, energizing the motor which drives the tuning control shaft. The motor circuit is designed so that auxiliary circuits (not shown) continue to apply power to the motor after the initial energizations so that the motor continues to rotate until the next channel is selected. The auxiliary motor control circuit may be of any well known type, such as that used in the RCA Model 21–RD–8525 television receiver.

The frequency selective circuit 68 for audio muting control is tuned to 3.5 kc., and produces a control voltage in response to a beat signal of that frequency to trigger the keying amplifier 134. When the amplifier 134 conducts, a relay 136 in the plate circuit thereof is energized, causing power to be applied to a bi-stable relay 138. The movable contact 140 of the bi-stable relay 138 in one position thereof connects the conventional volume control arm of a potentiometer (not shown) directly to an audio amplifier grid input circuit as is conventional. In this position the television receiver sound is normal. In the second position of the movable contact 140 (as shown) a mute volume control potentiometer 142 is connected between the conventional volume control movable tap and ground, and the movable tap 144 on the potentiometer 142 is connected to the audio amplifier input circuit. In this manner the audio level may be reduced by a predetermined amount as controlled by the setting of the tap 144 on the potentiometer 142, when a beat frequency signal of 3.5 kc. is produced in the receiver in response to the operation of the push-button 22 at the remote control position.

In the operation of the receiver circuit, the two simultaneously received keying signals are heterodyned together to produce a beat frequency signal. At this point it should be noted that any changes in the dimensions of the resonators 12, 14 and 16 due to temperature variations do not seriously affect the frequency of the beat signal. This is because the temperature effect on the resonators is in the same direction and, although a relatively large change may take place in the fundamental frequency of any two of the resonators, the change in each will be about the same, so the frequency of the beat signal will remain substantially the same. This is true of both mechanical and electrical resonant circuit elements.

Signals of the beat frequency will not be translated through the remote control receiver since they are substantially outside the bandpass of the bandpass amplifiers 52, 54 and 56. Similarly, a single spurious signal having a frequency within the bandpass range cannot erroneously trigger the remote control circuits because two signals are needed to produce the required beat note. The immunity of the remote control circuits to erroneous triggering by spurious or random radiations is considerably improved since the probability of two stray signals of the proper amplitude, duration and frequency relationship existing simultaneously is much less than that of a single signal.

The beat frequency signal is amplified, and applied to the frequency selective circuits 64, 66 and 68 as well as to the rectifier 120. Since the selectivity of the circuits 64, 66 and 68 is not perfect, some positive voltage will be developed by each for application to the associated keying amplifiers. However, the circuit which is tuned to the frequency of the beat signal will produce a much larger positive voltage due to the gain through the series resonant circuit. At the same time a negative voltage proportional to the amplitude of the received signal is developed in the rectifier 120 circuit. This voltage which is applied together with the fixed negative bias and the positive control voltages to the control electrodes of the keying amplifiers is sufficiently negative to overcome the small positive voltage produced by the control circuits due to imperfections in the selectivity characteristics thereof, but is not sufficient to overcome the larger positive control voltage from the circuit which is tuned to the beat frequency signal. This feature insures that only the proper control function will be energized by any given beat signal. As mentioned above, due to the gain of the series resonant circuit tuned to the frequency of the beat signal, this positive voltage is of sufficient amplitude to drive a keying amplifier into conduction, thereby energizing the relay associated therewith.

The rectifier circuit 120 has the additional advantage of increasing the negative bias applied to all of the keying amplifiers in the presence of random noise such as the jingling of keys or coins. Aside from the fact that it is unlikely that two random signals of proper frequencies and of sufficient amplitude and duration to trigger the keying amplifiers would occur simultaneously, the increased negative bias applied to the keying amplifiers as a result of the noise helps to prevent the erroneous triggering of these amplifiers due to short time high amplitude pulses.

Having described our invention, what is claimed is:

1. A remote control system comprising in combination, a transmitter for simultaneously transmitting a pair of control signal waves, a receiver responsive to said control signal waves to produce a beat signal corresponding in frequency to the difference in frequency between said control signals, an electrical circuit actuatable between at least two different operating conditions, and means responsive to said beat signal for actuating said electrical circuit between its different operating conditions.

2. A remote control system for controlling an electrical circuit actuatable between at least two different operating conditions comprising in combination a transmitter for simultaneously transmitting a pair of control signal waves of different frequencies, a receiver including an input circuit responsive to the frequencies of said control signal waves, a detector circuit coupled to said input circuit and responsive to said control signal waves to provide a beat signal corresponding in frequency to the difference in frequency between said control signal waves, a frequency responsive circuit coupled to said detector circuit tuned to the frequency of said beat signal for producing a control voltage, and a keying circuit coupled to said frequency responsive circuit for utilizing said control voltage to actuate said electrical circuit between its different operating conditions.

3. A remote control system for controlling a plurality of electrical circuits each actuatable between at least two different operating conditions comprising in combination a transmitter for transmitting a plurality of pairs of control signal waves, a receiver for simultaneously receiving pairs of said control signal waves including an input circuit responsive to the frequencies of said control signal waves, a detector circuit coupled to said input circuit and responsive to any of said pairs of simultaneously received control signal waves to produce a beat signal corresponding in frequency to the difference in frequency between any of said pairs of control signal waves, the control signal waves of each of said pairs differing in frequency by different amounts so that each pair of control signal waves produces a beat signal of a frequency different from the frequency of the beat signal produced by any other pair of control signal waves, a plurality of frequency responsive circuits coupled to said detector circuit, said frequency responsive circuits being tuned respectively to the frequencies of the beat signals of different ones of said pairs of control signal waves for producing respective control voltages, and a plurality of keying circuits each individually coupled to one of said frequency responsive circuits and to one of said electrical circuits, said keying circuits being responsive to said control voltage from its associated frequency responsive circuit to actuate the electrical circuit associated therewith between its different operating conditions.

4. A remote control system comprising in combination, a supersonic sound wave transmitter for a remote control system comprising a plurality of mechanical resonators, means for simultaneously exciting two of said resonators for simultaneously radiating supersonic sound waves at the resonant frequencies of said resonators, and a receiver responsive to said supersonic sound waves to produce a beat signal corresponding in frequency to the difference in frequency between said waves, an electrical circuit actuatable between at least two different operating conditions, and means responsive to said beat signals for actuating said electrical circuit between its different operating conditions.

References Cited in the file of this patent

UNITED STATES PATENTS

| | | |
|---|---|---|
| 1,465,932 | Colpitts | Aug. 28, 1923 |
| 2,193,102 | Koch | Mar. 12, 1940 |
| 2,194,559 | Koch | Mar. 26, 1940 |
| 2,345,472 | Goldsmith | Mar. 28, 1944 |
| 2,449,391 | Kogane | Sept. 14, 1948 |
| 2,541,329 | Boosman et al. | Feb. 13, 1951 |
| 2,602,852 | Lense et al. | July 8, 1952 |
| 2,739,273 | Andrews et al. | Mar. 20, 1956 |
| 2,817,025 | Adler | Dec. 17, 1957 |
| 2,821,954 | Adler | Feb. 4, 1958 |
| 2,821,955 | Ehlers et al. | Feb. 4, 1958 |
| 2,943,146 | Thomas | June 28, 1960 |
| 2,954,545 | Drake | Sept. 27, 1960 |